United States Patent [19]

Strom

[11] Patent Number: 4,896,846

[45] Date of Patent: Jan. 30, 1990

[54] SUPERAGILE TACTICAL FIGHTER AIRCRAFT AND METHOD OF FLYING IT IN SUPERNORMAL FLIGHT

[75] Inventor: Thomas H. Strom, Newport News, Va.

[73] Assignee: Dynamic Engineering, Inc., Newport News, Va.

[21] Appl. No.: 194,734

[22] Filed: Sep. 15, 1987
(Under 37 CFR 1.47)

Related U.S. Application Data

[63] Continuation-in-part of Ser. No. 721,664, Apr. 9, 1985, abandoned.

[51] Int. Cl.$^4$ ............................ B64C 9/00; B64C 15/00
[52] U.S. Cl. .............................. 244/75 R; 244/45 A; 244/52; 244/53 B; 244/12.5
[58] Field of Search ...................... 244/45 A, 75 R, 52, 244/45 R, 53 B, 12.5, 23 D, 214

[56] References Cited

U.S. PATENT DOCUMENTS

| | | | |
|---|---|---|---|
| 3,926,389 | 12/1975 | Mederer | 244/45 A |
| 4,010,920 | 3/1977 | Farner | 244/89 |
| 4,012,013 | 3/1977 | Ball et al. | 244/53 B |
| 4,099,687 | 7/1978 | Roberts et al. | 244/7 R |
| 4,261,533 | 4/1981 | Roberts et al. | 244/7 R |
| 4,281,810 | 8/1981 | Poisson-Quinton et al. | 244/75 R |
| 4,569,493 | 2/1986 | Burhans, Jr. | 244/76 R |

FOREIGN PATENT DOCUMENTS

| | | |
|---|---|---|
| 2421524 | 11/1974 | Fed. Rep. of Germany. |
| 2327612 | 12/1974 | Fed. Rep. of Germany. |
| 522296 | 6/1946 | United Kingdom. |
| 959405 | 6/1964 | United Kingdom. |
| 2097863 | 11/1982 | United Kingdom. |

OTHER PUBLICATIONS

SAE Technical Paper Series, No. 821469, "Flight at Supernormal Attitudes" by Thomas H. Strom and William J. Alford, Jr., for Aerospace Congress & Exposition, Oct. 28, 1982.

"Controllable Supernormal Flight: A Future Possibility", for *Automotive Engineering*, vol. 90 at pp. 48–53, Dec. 1982.

"NASA Researches Aircraft Control During Deep Stall", Aviation Week & Space Technology, at pp. 53 and 54, Oct. 31, 1983.

Breaking the Stall Barrier by Thomas A. Horne, AOPA Pilot, May 1984.

Moore et al, "X-29 Forward Swept Wing Aerodynamic Overview", Jul. 1983, pp. 1–8.

W. B. Herbst, Future Fighter Technologies, Aug. 1980, pp. 561–566.

J. A. Laughrey, D. J. Drape and P. E. Hiley; Performance Evaluation of an Air Vehicle Utilizing Nonaxisymmetric Nozzles; Feb. 1981; pp. 89–95.

*Primary Examiner*—Joseph F. Peters, Jr.
*Assistant Examiner*—Rodney Corl
*Attorney, Agent, or Firm*—Joseph Scafetta, Jr.

[57] ABSTRACT

A superagile tactical fighter aircraft and a method of flying it are disclosed. The superagile aircraft is characterized by articulatable air inlets, articulatable exhaust nozzles, highly deflectable canard surfaces, and control thruster jets located around the nose of the fuselage, on the top and bottom surfaces of the propulsion system near the exhaust nozzles, and on both sides of at least one vertical tail. The method of operating the superagile aircraft comprises the step of articulating the air inlets and exhaust nozzles, deflecting the canard surfaces, and vectoring the thruster jets so that supernormal flight is attained. Supernormal flight may be defined as flight at which the superagile aircraft operates at an angle of attack much greater than the angle of attack which produces maximum lift. In supernormal flight, the superagile aircraft is capable of almost vertical ascents, sharp turns, and very steep descents without losing control. Enhanced survivability of the pilot and the aircraft is achieved by the invention.

9 Claims, 4 Drawing Sheets

SUPERAGILE TACTICAL FIGHTER AIRCRAFT AND METHOD OF FLYING IT IN SUPERNORMAL FLIGHT

CROSS-REFERENCE TO RELATED APPLICATION

This application is a continuation-in-part of U.S. patent application Ser. No. 721,664, filed Apr. 9, 1985, abandoned concurrently with the filing of this application.

BACKGROUND OF THE INVENTION

1. Field of the Invention

The invention relates to the field of aeronautics, in particular to aircraft manuevering and control devices of a fixed wing aircraft with a human pilot assisted by an automatic flight control system.

2. Brief Description of the Related Art

Until about 1978, the region beyond stall was considered an unacceptable flight regime frequently characterized by uncontrollable flight in spins and by undesirable deep stalls. Any deep stall condition is characterized by a stable trimmed flight but at a high angle of attack from which return to normal flight may be difficult or impossible. A deep stall may be defined as an out-of-control condition at an angle of attack greater than the angle of attack for maximum lift with no significant motion other than a high rate of descent. Conventional airplanes usually stall and lose control effectiveness at angles of attack in the range of 18° to 20°.

However, according to U.S. Pat. Nos. 4,261,533 and 4,099,687, it is now possible, through the use of a rotatable horizontal tail on aft-tail configurations or through the use of tiltable engines on the wings, to provide stable and controllable flight at extremely high airplane angles of attack.

Because movement other than a high rate of descent can be controlled by varying thrust levels and all moveable control surfaces with large deflections, the safety and usefulness of flight at extremely high angles of attack are being re-examined and redefined.

The essence of the longitudinal control concept, as set forth in U.S. Pat. Nos. 4,261,533 and 4,099,687, is to rotate the tail or to deflect large chord elevons to magnitudes of approximately the same order, but of opposite direction, as the airplane angle of attack, so that the effective tail aerodynamic angle of attack is below the tail stall angle and is thus capable of providing both stability and control for the entire aircraft.

Although rotatable canard arrangements are known from U.S. Pat. No. 4,569,493, U.S. Pat. No. 4,281,810, U.S. Pat. No. 4,010,920, and West German Offenlegungsschrift 2421524, such arrangements deal strictly with the stability and control of aircraft and models in level and unstalled low angle of attack regions of flight and do not address the problems of stability and control of aircraft in the high angle of attack regions of flight.

In most cases, the upper limit of normal flight is associated with conditions for maximum lift, beyond which the wing is completely stalled. For some aircraft configurations, however, for example, those employing wings with high leading edge sweep angles or incorporating strakes, i.e. a continuous band of plates on the fuselage, partial flow separation of the wing or control surfaces may induce stability problems below the attack angles for maximum lift and impose lower limits on the normal flight regions.

Solutions of these problems will allow flight above these lower limits. Flight above the normal limits is considered of a supernormal nature.

SUMMARY OF THE INVENTION

The present invention is directed to a fixed wing aircraft with canard control surfaces and a method of human-piloted operation thereof permitting supernormal flight which is concerned with flight at extraordinary angles of attack, resulting in substantial changes in the pitch and the flight path angles and also resulting in the attainment of flight paths and vertical velocities which are not normally attainable.

In piloted supernormal flight of the aircraft of the present invention, the wing of an aircraft, such as a superagile tactical fighter, is either partially or completely stalled, while the longitudinal control surfaces, such as in a rotatable canard arrangement, are deflected to approximately the same magnitude, but of opposite sign, as the angle of attack of the aircraft, so that the canard arrangement remains effective to control the aircraft through large ranges of angles of attack, pitch, and flight path. Such angles may vary from descending flight to deep stall, i.e. −45°, to ascending flight in vertical climb, i.e. +90°.

Also, fully articulating air inlets at a front end of the propulsion system and fully articulating exhaust nozzles at a rear end of the propulsion system are articulated to appropriate directions relative to the air flow so that the inlet operates effectively throughout the large angle of attack range and also so that thrust is vectored in the desired direction by the exhaust nozzle deflections.

Thrust may likewise be vectored by small thruster jets or other similar devices arranged around the nose of the fuselage, on the propulsion system near the exhaust nozzles, and on the at least one vertical tail to provide control forces and moments at low speeds where the aerodynamic control surfaces tend to lose effectiveness.

The advantages of such supernormal flight include: improved safety through prevention of spins; steep descents and approaches to landings; precise, steep survivable recoveries of remotely piloted vehicles; and enhanced high angle of attack control manueverability and agility.

DETAILED DESCRIPTION OF THE PREFERRED EMBODIMENT

Figure 1A:
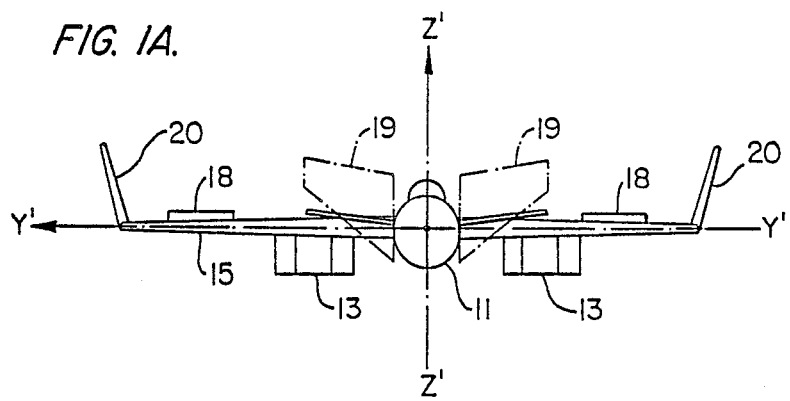
FIG. 1A shows a front elevational view of the superagile tactical fighter aircraft of the present invention in level flight.
Figure 1B:
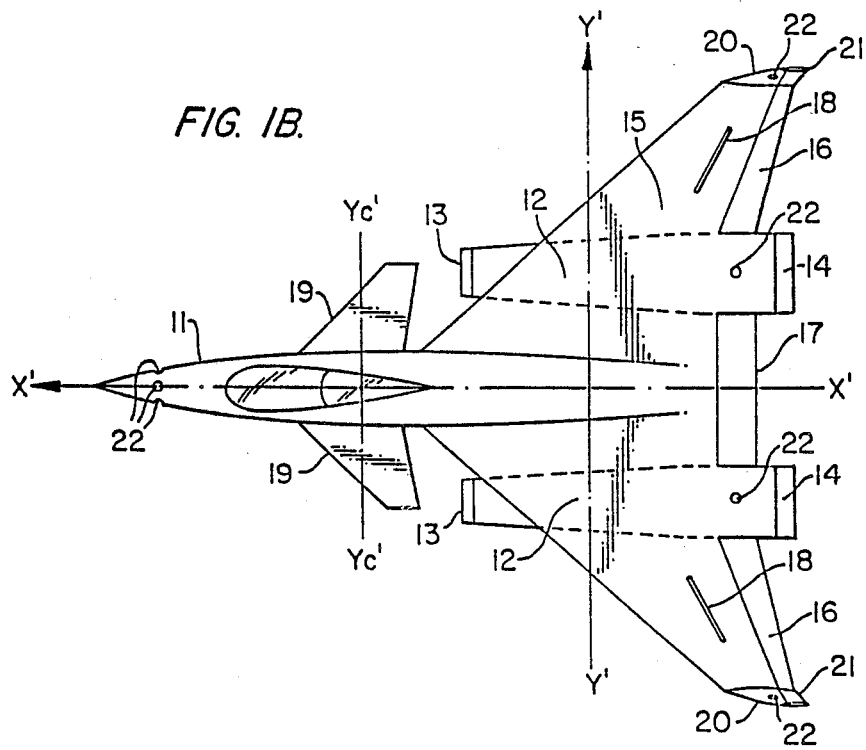
FIG. 1B shows a top plan view of the superagile tactical fighter in level flight.
Figure 1C:
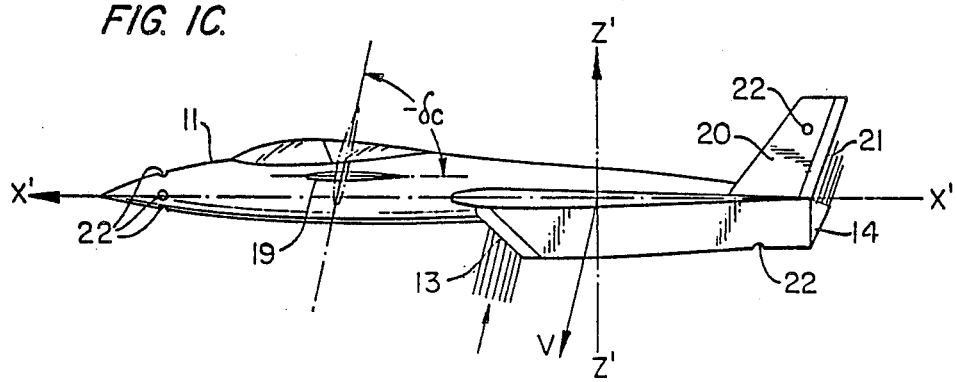
FIG. 1C shows a side elevational view of the superagile tactical fighter in descending flight.

As illustrated in FIGS. 1A through 1C, a superagile fixed wing tactical fighter aircraft, suitable for flying according to the supernormal method of the present invention, comprises a fuselage 11 to enclose a human pilot, a payload, and fuel, as well as automatic flight control, navigation, and life support systems to assist the pilot. The fuselage 11 has a nose, a midsection, and an aft section. A jet engine propulsion system 12 has fully articulating air inlets 13 at a front end for supplying a continuous flow of minimally distorted air flow, thereby maintaining efficient engine operation of the high thrust-to-weight propulsion system 12 over the entire flight regime, but particularly at high angles of attack and low speeds. Also, fully articulating exhaust nozzles 14 at a rear end are provided for modulating and directing thrust forces produced by the propulsion system 12. Although a twin engine propulsion system 12 is shown, a single engine or another multi-engine system may be used instead. A swept or modified delta fixed wing 15 is mounted on the aft section of the fuselage 11 and is equipped with flaperons 16, elevons 17, and spoilers 18. The wing 15 has the propulsion system 12 mounted thereunder and this fixed wing 15 is the primary surface for producing the aerodynamic resultant force characteristics of the aircraft.

Mutually perpendicular reference planes are defined by the three intersecting axes: longitudinal or horizontal X'—X', lateral Y'—Y', and vertical Z'—Z'.

As shown in all FIGS. 1A-1C, twin secondary control force-generating canard surfaces 19, mounted on the midsection of the fuselage 11, are separated from and located forward of the wing 15 to provide destabilizing and controlling forces about the lateral Y'—Y' axis. These canard surfaces 19 are symmetrically located about the longitudinal axis X'—X' and are pivotable or rotatable about a lateral axis $Y_c'$—$Y_c'$, shown only in FIG. 1B, to any canard control deflection angle $\delta_c$, as shown in FIG. 1C, in a range from about +45° (trailing edge down but not shown) to about −90° (trailing edge up shown in FIG. 1C) relative to the longitudinal axis X'—X'. This large canard control deflection range, i.e. $+45° \geq \delta_c \geq -90°$, allows the canard surfaces 19 to be nearly aligned with the direction of local air flow over the aircraft so that the canard surfaces 19 remain unstalled. In order for an aircraft that employs canard control surfaces to be capable of trimmable and controllable flight at very high angles of attack, the aerodynamic surfaces on the aircraft (i.e. wing canards) and the distribution of the mass of its various components and systems must be arranged relative to the center of gravity so that the aircraft is longitudinally unstable, i.e. the slope of its pitching moment as a function of angle of attack must be positive.

Verticaly tails 20 provide directional stability and damping. Rudders 21 on the tail 20 provided yaw control and augment roll control obtained by the flaperons 16, elevons 17, and spoilers 18 on the wing 15.

As best shown in FIG. 1B, control thruster jets 22 are located near the nose of the fuselage 11, near the exhaust nozzles 14 of the propulsion system 12, and on the vertical tails 20. These control thruster jets 22 may be powered by an auxiliary power system (not shown) or by bleed from the propulsion system 12. The control thruster jets 22 provide control of the aircraft at velocities approaching zero.

Although not shown, an automatic flight control system including conventional programmable, pilot interactable, automatic avionic sensors, computers, effectors, and actuators inside the fuselage 11 help to provide rapid control and stability of the aircraft about the mutally perpendicular axes X'—X', Y'—Y' and Z'—Z' of FIGS. 1A-1C.

Utilization in several combinations of the propulsion system 12, fixed wing 15, canard surfaces 19, vertical tails 20, rudders 21, and the various stability and control augmentation systems by the human pilot allows the aircraft to operate in flight at angles of attack significantly greater than those associated with maximum lift. For this reason, the aforementioned elements and systems of the present invention may be defined as supernormal flight controls.

The nomenclature, symbols, and equations of motion applicable to the superagile tactical fighter aircraft, when flying according to the supernormal method of the present invention, are represented immediately hereinbelow:

(1) $\dot{X} = V \cos \gamma \cos \psi$ (2) $\dot{Y} = V \cos \gamma \sin \psi$ (3) $\dot{Z} = V \sin \gamma$ $$\dot{V} = g \left[ \frac{T}{W} \cos \alpha - \frac{C_D \rho V^2}{2W/S} - \sin \gamma \right] \quad (4)$$

$$\dot{\gamma} = g \left[ \left( \frac{T}{WV} \sin \alpha + \frac{c_L \rho V}{2W/S} \right) \cos \phi - \frac{\cos \gamma}{V} \right] \quad (5)$$

$$\dot{\psi} = g \frac{\sin \phi}{\cos \gamma} - \left[ \frac{T}{WV} \sin \alpha + \frac{C_L \rho V}{2W/S} \right] \quad (6)$$

(7) $\theta = \alpha + \gamma$

Where:

$C_L = \frac{L}{qS}$, Lift coefficient $C_D = \frac{D}{qS}$, Drag coefficient

D, Drag = $C_D$ q S
g, Acceleration due to gravity
L, Lift
S, wing area
T, Thrust
t, Time
V, Flight path velocity
V, Flight path acceleration $\left( \frac{dV}{dt} \right)$ X, Y, Z, Flat earth axes $\dot{X}, \dot{Y}, \dot{Z}$, Velocity components along flat earth axes
W, Weight
$q = 1/2 \rho V^2$, dynamic pressure
$\rho$, density of air
$\alpha$, angle of attack
$\gamma$, flight path angle
$\dot{\gamma}$, flight path angle velocity
$\theta$, pitch attitude angle
$\Phi$, bank angle
$\psi$, heading angle
$\dot{\psi}$, heading angle velocity (turn rate)

For purposes of these calculations, the superagile tactical fighter aircraft is represented as a point mass, without sideslip, operating over a flat, non-rotating earth.

Figure 2A:
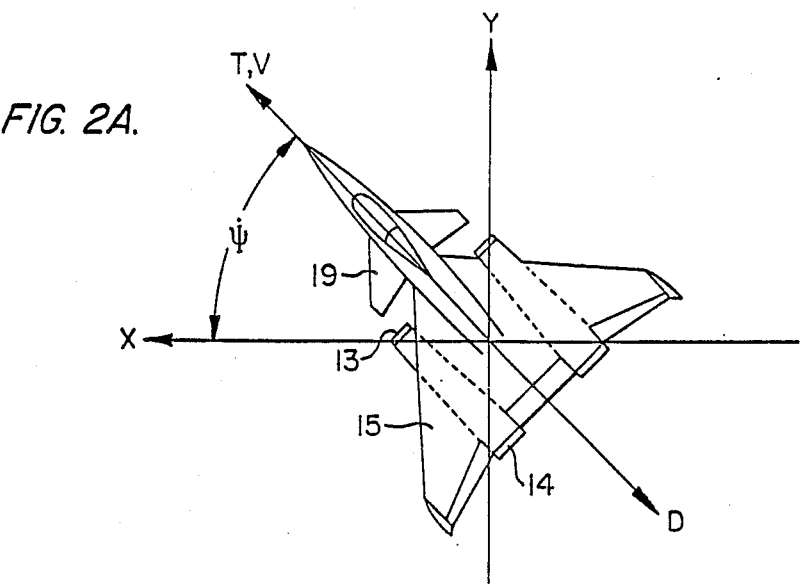
FIG. 2A shows a diagonal top plan view of the superagile tactical fighter at the center of a plane having horizontal (X) and lateral (Y) coordinates.
Figure 2B:
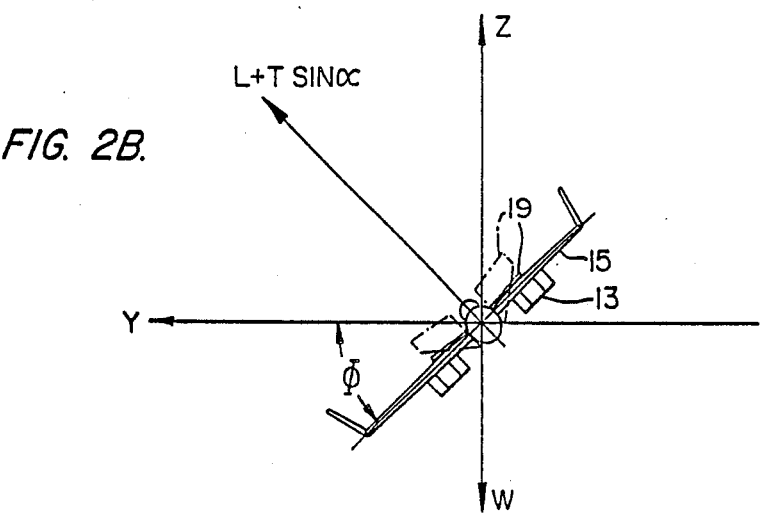
FIG. 2B shows a diagonal front elevational view of the superagile tactical fighter at the center of a plane having lateral (Y) and vertical (Z) coordinates.
Figure 2C:
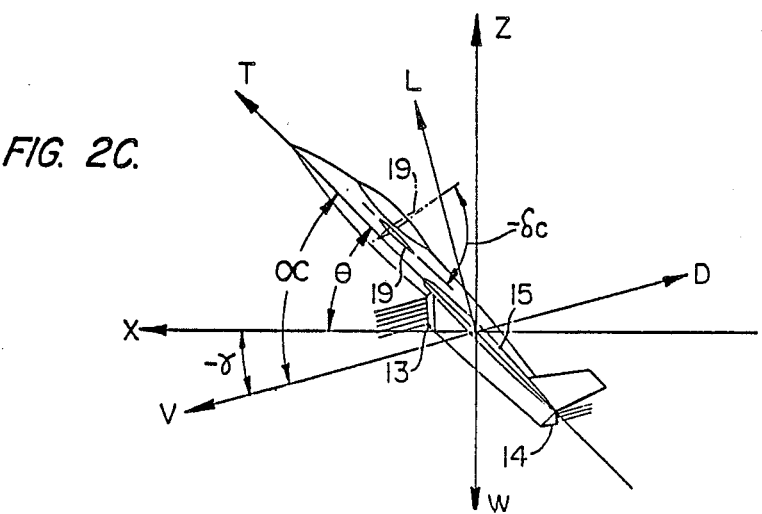
FIG. 2C shows a diagonal side elevational view of the superagile tactical fighter at the center of a plane having horizontal (X) and vertical (Z) coordinates.

The thrust T, lift L, drag D, velocity V, and various angular attitudes associated with and acting upon the aircraft in piloted supernormal flight are best illustrated in FIG. 2C. In such supernormal flight, the aircraft operates at an attack angle $\alpha$ much greater than the angle of attack for maximum lift so that the fixed wing 15 is either completely or partially stalled while the canard surfaces 19 are deflected in a negative sense through the deflection angle-$\delta_c$. The absolute deflection magnitude of the canard surfaces 19 is approximately the same as the attack angle $\alpha$ for the entire aircraft so that such canard surfaces 19 are nearly aligned with the local air flow and are, therefore, unstalled. Thus, the canard surfaces 19 remain effective as lift surfaces in providing the required forces and moments for controlling the entire aircraft.

The velocity components of the aircraft along the X, Y and Z axes are related to the aircraft flight path velocity V. flight path angle $\gamma$, and heading angle $\psi$, according to equations 1, 2 and 3 given above.

The flight path acceleration $\dot{V}$ of the aircraft is related to the thrust T, drag D, weight W, attack angle $\alpha$, and flight path angle $\gamma$, as stated by equation 4.

The flight path angle velocity $\dot{\gamma}$ of the aircraft is related to the thrust T, lift L, flight path velocity V, weight W, attack angle $\alpha$, band angle $\Phi$, and flight path angle $\gamma$, as stated by equation 5.

The heading angle velocity $\dot{\psi}$ or turn rate of the aircraft is related to the thrust T, lift L, flight path velocity V, weight W, attack angle $\alpha$, band angle $\Phi$, and flight path angle $\gamma$, according to equation 6.

As can be seen from equation 7, the pitch attitude angle $\theta$ of the aircraft is the sum of the attack angle $\alpha$ and the flight path angle $\gamma$.

The attributes characterizing the superagility of the tactical fighter aircraft are quantified by the magnitudes of the velocity V, acceleration $\dot{V}$, flight path angle velocity $\dot{\gamma}$, and heading angle velocity $\dot{\psi}$, in particular, and by the rapidity with which these attributes can be changed. A graphic illustration of the superagility, particularly the turning characteristics, of the tactical fighter aircraft in the horizontal-lateral plane X-Y is presented in FIG. 3. The heading angle velocity $\dot{\psi}$ or turn rate of the aircraft is a function of the Mach number M of the aircraft at an altitude of 20,000 feet and with a wing loading W/S of 68 pounds per square foot. The aircraft thrust-to-weight ratio T/W varies from a value of 0.5 at M=0 to 0.9 at M=0.9, as shown in the inset table in the upper right-hand corner of FIG. 3.

The region in which normal flight occurs is bounded by curves associated with the maximum lift coefficient $C_{Lmax}$ for a conventional aircraft and with the maximum structural load factor $\eta$ for the aircraft. The Mach number M and the turn rate $\dot{\psi}$ existing at the point where these curves intersect are referred to as "corner" conditions. For a conventional fighter aircraft, not equipped with the elements of the present invention, the turn rate $\dot{\psi}$ at the corner condition is the maximum instantaneous turn rate. For the specific example shown in FIG. 3, the maximum instantaneous turn rate for the conventional aircraft in normal flight is about 23° per second and occurs when the Mach number M is approximately 0.7. The turning radius R associated with these corner conditions for the conventional aircraft is about 1900 feet.

Figure 3:
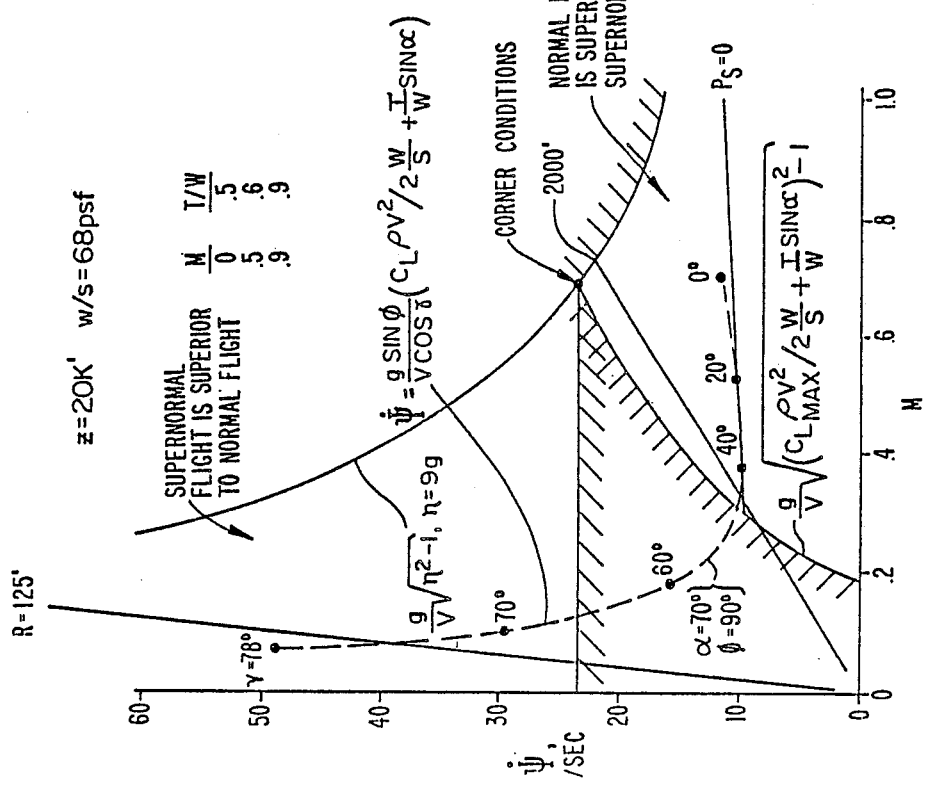
FIG. 3 is a graph showing the horizontal turn characteristics of the superagile tactical fighter in the X-Y plane.

The region in which supernormal flight occurs in FIG. 3 is bounded by the curve associated with the maximum structural load factor $\eta$ as an upper limit and by the line associated with the turn rate $\dot{\psi}$ at the corner condition as a lower limit. The change in the heading angle $\psi$ with the change in time is described by equation 6 above and is defined as the heading angle velocity or turn rate $\dot{\psi}$. For example, if the angle-of-attack $\alpha$ is 70° and the bank angle $\Phi$ is 90°, the change in the turn rate $\dot{\psi}$ or the instantaneous turn rate variation is illustrated by the dashed curve. The superagile tactical fighter of the present invention, when flying at this angle-of-attack $\alpha$ of 70°, would exceed the normally maximum corner turn rate $\dot{\psi}$ at a Mach number M of less than about 0.18 as the flight path angle $\gamma$ reaches about 65°. At a flight path angle $\gamma$ of 78°, the turn rate $\dot{\psi}$ approaches 50° per second and the turning radius R is less than 125 feet. For reference purposes, there is also shown the sustained turn rate characteristics for the aircraft when the thrust-minus-drag is zero, i.e. T−D=0. In other words, the specific excess power is zero, i.e. $P_s = 0$.

Figure 4:
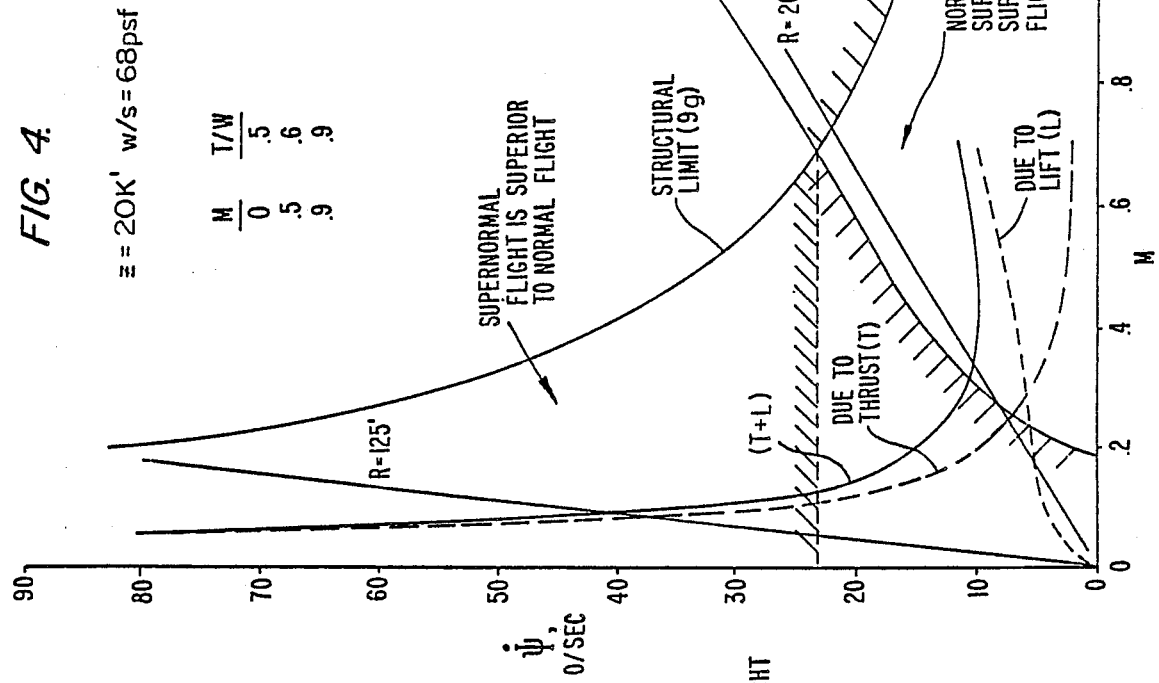
FIG. 4 is a graph showing in more detail the contributions of lift and thrust to the turning characteristics of the superagile tactical fighter in the X-Y plane.

To better describe the physical aspects of supernormal flight, additional characteristics of a turn by a superagile tactical fighter aircraft are presented in FIG. 4. Basically, the data in FIG. 4 are the same data presented in FIG. 3 with the addition of the turn rates $\dot{\psi}$ associated with the thrust T and the lift L. Equation 6 above shows the relationship of the heading angle velocity or turn rate $\dot{\psi}$ to both the thrust T and the lift L. For the particular flight conditions illustrated in FIG. 4, the thrust-related term in equation 6 predominates when the Mach number M is below 0.28 but the lift-related term predominates when the Mach number M is above 0.28.

Figure 5:
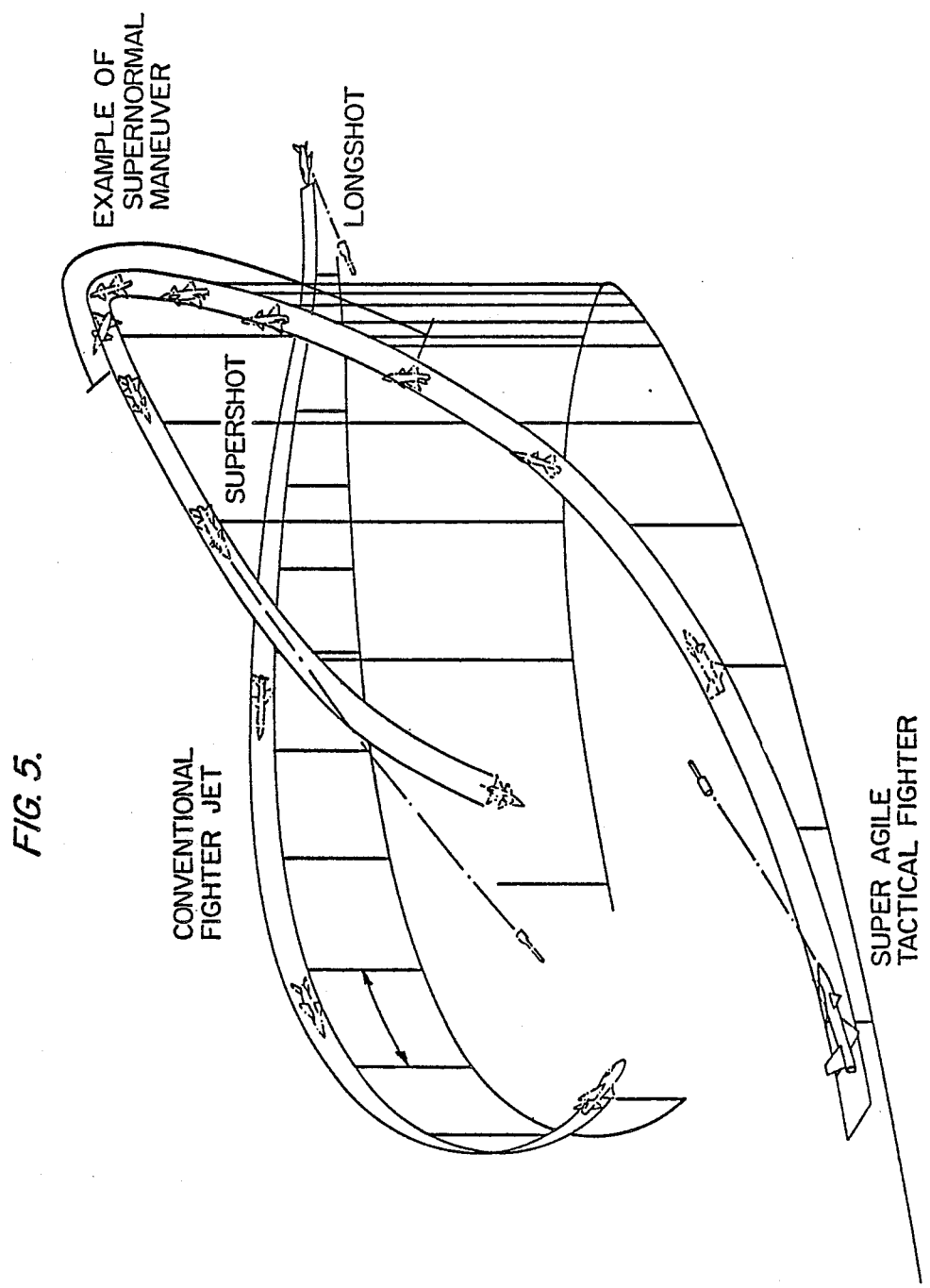
FIG. 5 is a schematic perspective view illustrating the turning performance of the superagile tactical fighter in aerial combat against a conventional fighter jet aircraft.

A pictorial turning performance illustration of the characteristics shown in FIGS. 3 and 4 is presented in FIG. 5 where an elementary one-on-one combat maneuver between the superagile tactical fighter of the present invention and a conventional fighter jet which does not have features for supernormal flight is described. Upon positive identification, the opponents have the options of firing a long or medium range missile and or beginning to maneuver at their maximum capability to evade the incoming missile while simultaneously trying to position themselves for close-in combat. The conventional fighter jet is limited to flying at its corner Mach number or velocity because it does not have the capability of supernormal flight at an angle of attack beyond that permitted by the maximum lift coefficient. On the other hand, the superagile tactical fighter aircraft of the present invention begins its maneuvering by increasing thrust, preferably to a maximum. Next the pilot will climb by increasing the angle of attack of the aircraft to a very high level, say 70°, and then progressively increasing its flight path angle $\gamma$ and bank angle $\Phi$ to values approaching 90°.

Thus, as shown pictorially in FIG. 5 and graphically in FIGS. 3 and 4, the superagile tactical fighter aircraft in supernormal flight accomplishes a decelerating, steep climb with a turn rate $\dot{\psi}$ over twice that of the conventional fighter jet attempting to operate at its corner Mach mumber M or velocity V. The turning maneuver in supernormal flight is analogous to a skidding turn of a powerful decelerating wheeled vehicle. This turning maneuver allows the superagile tactical fighter aircraft of the present invention to turn tightly inside the flight path of the opposing conventional fighter jet and to launch a "supershot" short range missile before the opponent can turn and get into a firing position, thereby scoring an aerial victory.

Although not illustrated herein, it is certain that innovative aerial combat tacticians will develop other multi-aircraft encounter techniques which will use the features of the present invention in order to achieve greater advantages for the superagile tactical fighter aircraft.

The method of the present invention relates to flying and controlling a superagile tactical fighter aircraft employing highly deflectable canard surfaces 19 and having control thruster jets 22 on the nose of the fuselage 11, near the exhaust nozzles 14 of the propulsion system 12, and on both sides of vertical tails 20 so that the aircraft may engage in supernormal flight in order to provide extraordinarily agile maneuverability characteristics or "superagility", relative to the maneuverability characteristics of a conventional fighter jet not capable of the present inventive method of flying because it lacks the aerodynamic structures of the present invention. Thus, such a conventional jet is restricted to flying, at best, at its corner Mach number M or velocity V, i.e. at the maximum permissible limit of normal flight at the highest angle of attack associated with maximum lift.

For example, the method of flying the superagile tactical fighter aircraft of the present invention in supernormal flight may comprise several steps. First, the superagile aircraft initiates an aerial maneuver or responds to the initiation of an aerial maneuver by an opposing fighter jet of essentially equal technological development except that the latter does not have the supernormal control system of the present invention and therefore is restricted to maneuvers associated with angles of attack less than or equal to the angle of attack at which maximum lift occurs. The opposing fighter jet is also limited to a maximum turn rate $\dot{\psi}$ at the corner Mach number M or velocity V where the turn rate $\dot{\psi}$ provided by maximum lift and the turn rate $\dot{\psi}$ allowed by the ultimate structural load factor $\eta$ for the conventional fighter jet are equal.

According to FIG. 4, a representative value of a maximum turn rate $\dot{\psi}_{max}$ for a conventional fighter jet not equipped with the present invention but flying in normal flight at 20,000 feet altitude is about 22° to 25° per second and the corresponding corner Mach number M is about 0.7, i.e. a velocity V of about 725 feet per second at such altitude.

The second step of the inventive method of flying the superagile tactical fighter aircraft is that, upon sighting the opposing conventional fighter jet either visually or by electronic systems, the superagile aircraft increases its thrust to a maximum level and uses coordinated deflections of its canard surfaces 19, vectoring of its control thruster jets 22, and articulating of its air inlets 13 and of its exhaust nozzles 14 in order to increase the angle-of-attack $\alpha$ of the superagile aircraft to about 35° so as to effect a large increase in the flight path angle $\gamma$ and in the rate of climb.

As the superagile aircraft begins to decelerate because of the large increase in induced drag associated with the high angle-of-attack $\alpha$, the angle-of-attack $\alpha$ is further increased to values in the range of 60° to 70° and the superagile aircraft is banked at a high angle $\Phi$ approaching 90°. This high banking maneuver allows the superagile aircraft to decelerate further to a very low velocity so that it can turn and redirect itself rapidly. Since the heading angle velocity $\dot{\psi}$ or turn rate of the superagile aircraft is determined primarily at low speed below M=0.28 by the thrust-dependent term T/WV sin $\alpha$ in equation 6 because the velocity V is in the denominator, the ability of the superagile aircraft to turn rapidly and redirect itself allows such superagile aircraft to gain a favorable position for weapon firing opportunities against the opposing conventional fighter jet.

One advantage of the present invention relates to the stresses endured by the pilot when the superagile aircraft is decelerated along the steep flight path shown in FIG. 5. Deceleration inertial forces produced by thrust vectoring and aerodynamic drag associated with high angles-of-attack are much larger than the deceleration forces associated with the angle-of-attack which produces maximum lift. The deceleration inertial forces cause the pilot of the superagile aircraft to experience "eyeballs-down" stresses that are more endurable than "hang-in-the-belt", "eyeball-out" stresses that are normally associated with the deceleration of a conventional fighter jet which is constrained to fly at or below the angle-of-attack which produces maximum lift.

The method of the present invention further involves the flying and controlling of the superagile tactical fighter aircraft by redeflecting the rotatable twin canard surfaces 19 to an angle-of-attack below the angle-of-attack which produces maximum lift in order to provide extraordinary unaccelerated, or return to unaccelerated, trimmed flight conditions.

The inventive method of supernormal flight comprises the further steps of applying, modulating, and vectoring thrust, controllably orienting the superagile aircraft at a pitch attitude in the range of 0° to about 90°, and causing the aircraft to descend steeply and rapidly in altitude, as shown in FIG. 5, while stability and control are maintained. Eventually, the pilot levels the aircraft out so that it returns to normal unaccelerated trimmed flight conditions.

Further steps of the present inventive method involve controlling roll, yaw, and pitch by deflecting the aerodynamic controls 16, 17, 18, 19 and 21 and by vectoring the thruster jets 22 in the directions opposing any undesirable motions. For example, as best shown in FIG. 1C, operation of the control thruster jets 22 on the bottom surface of the nose of the fuselage 11 in combination with the articulating air inlets 13 and the articulating exhaust nozzles 14 will force the nose of the aircraft up while, as best shown in FIG. 1B, operation of the control thruster jets 22 on the top surface of the rear of the propulsion system 12 near the articulating exhaust nozzles 14 will force the tail of the aircraft down so that an undesirable nose-down pitch of the aircraft is counteracted and eliminated. Operation of the other thruster jets 22 will counteract and eliminate other undesirable movements of roll, yaw, and pitch. These operations need not be detailed herein because they should be discernible to persons of ordinary skill in the field of aerodynamics from the example given immediately hereinabove. By operating the thruster jets 22 in combination with the articulating air inlets 13 and the articulating exhaust nozzles 14 to control roll, yaw, and pitch, the superagile aircraft is prevented from attaining aerodynamic stall of the primary wing 15. In the event of inadvertent stall, the pilot can rapidly actuate the highly deflectable canard surfaces 19, the articulatable air inlets 13, the articulatable exhaust nozzles 14, and the thruster jets 22 to attain an angle-of-attack $\alpha$ sufficiently higher than that associated with maximum lift.

Thus, a nose-high aircraft pitch attitude angle $\theta$ is attained, thereby providing a favorable ejection attitude and enhanced survivability for the pilot in the event that hard contact of the superagile aircraft is anticipated to be unavoidably made with the ground. A favorable ejection attitude is one in which the pilot will be ejected from the aircraft in a direction away from the ground.

The method of the present invention also involves the steps of actuating the highly deflectable canard surfaces 19 and operating the thruster jets 22 to control roll, yaw and pitch so that the superagile aircraft is prevented from entering into flight conditions wherby it will begin or sustain a spinning motion. In the event of an inadvertent spinning motion, the pilot can rapidly actuate the canard surfaces 19 and the thruster jets 22 to counteract and eliminate the equilibrium between aerodynamic forces and centrifugal forces that exist in a sustained spinning motion.

The highly deflectable canard surfaces 19 and the thruster jets 22 may also be operated to return the superagile aircraft from the high angle-of-attack $\alpha$ of supernormal flight to a normal flight condition existing below the angle-of-attack $\alpha$ for maximum lift.

The foregoing preferred embodiments of the superagile aircraft and of the methods of flying it are considered illustrative only. Numerous other modifications and changes will readily occur to those of ordinary skill in aerodynamic technology after reading the foregoing disclosure. Consequently, the disclosed aircraft and method of flying it are not limited to the exact constructions and steps shown and described herein but are intended to embrace other embodiments within the purview of the appended claims without departing from the spirit and scope of the present invention.

What I claim as my invention is:

1. A superagile tactical fighter aircraft comprising:
   a fuselage having a nose, a midsection, an aft section and at least one vertical tail, said fuselage adapted to house a human pilot, a payload, fuel, automatic flight control systems, a navigation system, and a life support system to assist and sustain the pilot;
   fixed wings mounted on the aft section of the fuselage, behind a center-of-gravity of the aircraft;
   a high thrust-to-weight propulsion system being mounted to the wings;
   fully articulating air inlets at a front end of the propulsion system, said air inlets being deflectable so as to face into a local air stream so as to provide minimally distorted air flow to the propulsion system throughout a complete flight regime but particularly at very high angles of attack and low air speeds;
   fully articulating exhaust nozzles at a rear end of the propulsion system, said exhaust nozzles being rapidly deflectable so as to allow the pilot the capability to vector and direct gross thrust produced by the propulsion system; and
   rotatable canard surface means, mounted on the midsection on the fuselage in front of the center-of-gravity and separate from the wings, for fully and rapidly deflecting air flow thereacross in an angle-of-attack range with trailing edge about 90° up to trailing edge about 45° down, said canard surface means being located so as to provide pitch control forces and moments and to cause the aircraft to be longitudinally unstable and capable of trimming at very high angles of attack approaching the range from 70° to 90°.

2. The aircraft according to claim 1, further comprising:
   thruster jet means, or any other acceptable force means, arranged around the nose of the fuselage, on the propulsion system near the exhaust nozzle, and on at least one vertical tail for vectoring thrust.

3. A method of flying a human-piloted longitudinally unstable fixed-wing tactical fighter aircraft comprising the steps of:
   initiating an aerial maneuver in a vertical or pitch plane to very high angles of attack and pitch approaching a range from 70° to 90° by:
   highly deflecting rotatable canard surfaces on the aircraft to provide an angle-of-attack greater than an angle-of-attack which produces maximum lift;
   increasing thrust of a propulsion system to a maximum capability;
   vectoring gross thrust of the propulsion system by deflecting articulating exhaust nozzles to angles which augment turning capability and assure control of the aircraft at low velocities;
   deflecting articulating air inlets at the appropriate angle to face into a local air stream so as to provide minimally distorted air flow to the propulsion system; banking the aircraft to angles approaching 90°; decelerating the aircraft to a velocity less than stalling velocity;
   turning the heading angle of the aircraft; and pointing the aircraft in any direction necessary to be aimed at an opposing or threatening aircraft; whereby the aircraft has, by developing very high turn rates and decelerations, effectively become superagile in supernormal flight.

4. The method according to claim 3, further comprising the step of:
   redeflecting the rotatable canard surfaces, articulating air inlets, and articulating exhaust nozzles to positions so as to rapidly return the aircraft to an angle-of-attack below the angle-of-attack which produces maximum lift; whereby the aircraft returns in a controlled manner to an unaccelerated, trimmed normal flight condition.

5. The method according to claim 3, further comprising the steps of:
   vectoring thrust from control thruster jets, or any other acceptable force means, located around a nose, near exhaust nozzles, and on at least one vertical tail of the aircraft, in directions to provide acceptable and necessary control and trim about roll, yaw, and pitch axes of the aircraft at low velocities.

6. The method according to claim 3, further comprising the steps of:
   deflecting further the rotatable canard surfaces rapidly to attain an angle-of-attack sufficiently higher than the angle-of -attack which produces maximum lift so that a ccontrollable stable and trimmable nose-high aircraft pitch attitude is attained;

whereby favorable ejection attitude and enhanced survivability for a pilot is achieved in the event it appears that a hard contact of the superagile aircraft with ground is unavoidable.

7. The method according to claim 3, wherein:

said angle at which the gross thrust is vectored by the articulating exhaust nozzles is appropriate to provide necessary longitudinal and trim forces and moments at very low aircraft velocities.

8. The method according to claim 5, further comprising the steps of:

rapidly actuating the highly deflectable canard surfaces; providing roll, yaw, and pitch control by aerodynamic control surfaces;

rapidly actuating the thrust vectoring exhaust nozzles; and rapidly actuating the thruster jets;

whereby the superagile aircraft is prevented from entering into flight conditions under which it will begin spinning motions.

9. The method according to claim 5, further comprising the steps of:

rapidly actuating the highly deflectable canard surfaces;

providing roll, yaw, and pitch control by aerodynamic control surfaces;

rapidly actuating the thrust vectoring exhaust nozzles; and radidly actuating the thruster jets;

whereby, in the event of inadvertent spinning motions, any equilibrium between aerodynamic and centrifugal forces that exist are eliminated in said spinning motions, thereby allowing rapid recovery from the spinning motions.

* * * * *

UNITED STATES PATENT AND TRADEMARK OFFICE
CERTIFICATE OF CORRECTION

PATENT NO. : 4,896,846

DATED : January 30, 1990

INVENTOR(S) : Thomas H. Strom

It is certified that error appears in the above-identified patent and that said Letters Patent is hereby corrected as shown below:

On the cover page:

Col. 1, Section [56], line 13, change "6/1946" to --6/1940--.

Col. 2, Section [56], line 14, after "566" but before the period, insert --, Vol. 17, Journal of Aircraft--.

Section [56], line 17, after "95" but before the period, insert --, Vol. 18, Journal of Aircraft--.

In the specification:

Col. 2, line 39, delete "the".

Col. 3, line 63, correct the spelling of "Vertical".

Line 64, change "the" to --each-- and change "provided" to --provide--.

Col. 4, line 40, change "$c_L \rho V$" to --$C_L \rho V$-- and change "$\cos \phi$" to --$\cos \Phi$--.

UNITED STATES PATENT AND TRADEMARK OFFICE
CERTIFICATE OF CORRECTION

PATENT NO. : 4,896,846

DATED : January 30, 1990

INVENTOR(S) : Thomas H. Strom

It is certified that error appears in the above-identified patent and that said Letters Patent is hereby corrected as shown below:

Line 43, change "sin $\phi$" to --sin $\Phi$--.

Col. 5, line 1, change "$\ddot{Z}$" (first occurrence) to --$\dot{X}$--.

Line 7, change "$\gamma$" to --$\dot{\gamma}$--.

Line 11, change "$\psi$" to --$\dot{\psi}$--.

Line 14, change "non-rotating" to --nonrotating--.

Line 34, change "." to --,--.

Line 36, change "V" to --$\dot{V}$--.

Line 41, change "band" to --bank--.

Line 43, change "$\psi$" to --$\dot{\psi}$--.

Line 45, change "band" to --bank--.

Col. 6, line 22, change "$\psi$" to --$\dot{\psi}$--.

Line 24, between "of" and "at-", insert -- - --.

Line 52, change "described" to --shown--.

UNITED STATES PATENT AND TRADEMARK OFFICE
CERTIFICATE OF CORRECTION

PATENT NO. : 4,896,846

DATED : January 30, 1990

INVENTOR(S) : Thomas H. Strom

It is certified that error appears in the above-identified patent and that said Letters Patent is hereby corrected as shown below:

Col. 7, line 6, correct the spelling of "number".

Line 28, correct the spelling of "extraordinarily".

Line 51, change "ψprovided" to -- ψ provided--.

Col. 9, line 23, correct the spelling of "whereby".

In the Claims:

Claim 6, col. 11, line 1, correct the spelling of "controllable".

Claim 9, col. 12, line 12, correct the spelling of "rapidly".

Signed and Sealed this

Nineteenth Day of March, 1991

Attest:

HARRY F. MANBECK, JR.

*Attesting Officer*  *Commissioner of Patents and Trademarks*